Sept. 17, 1968             L. COOK             3,401,561

DIFFERENTIAL PRESSURE RESPONSIVE APPARATUS

Filed Aug. 9, 1966             2 Sheets-Sheet 1

INVENTOR
Lyman Cook
BY
Curtis Morris + Safford
ATTORNEYS

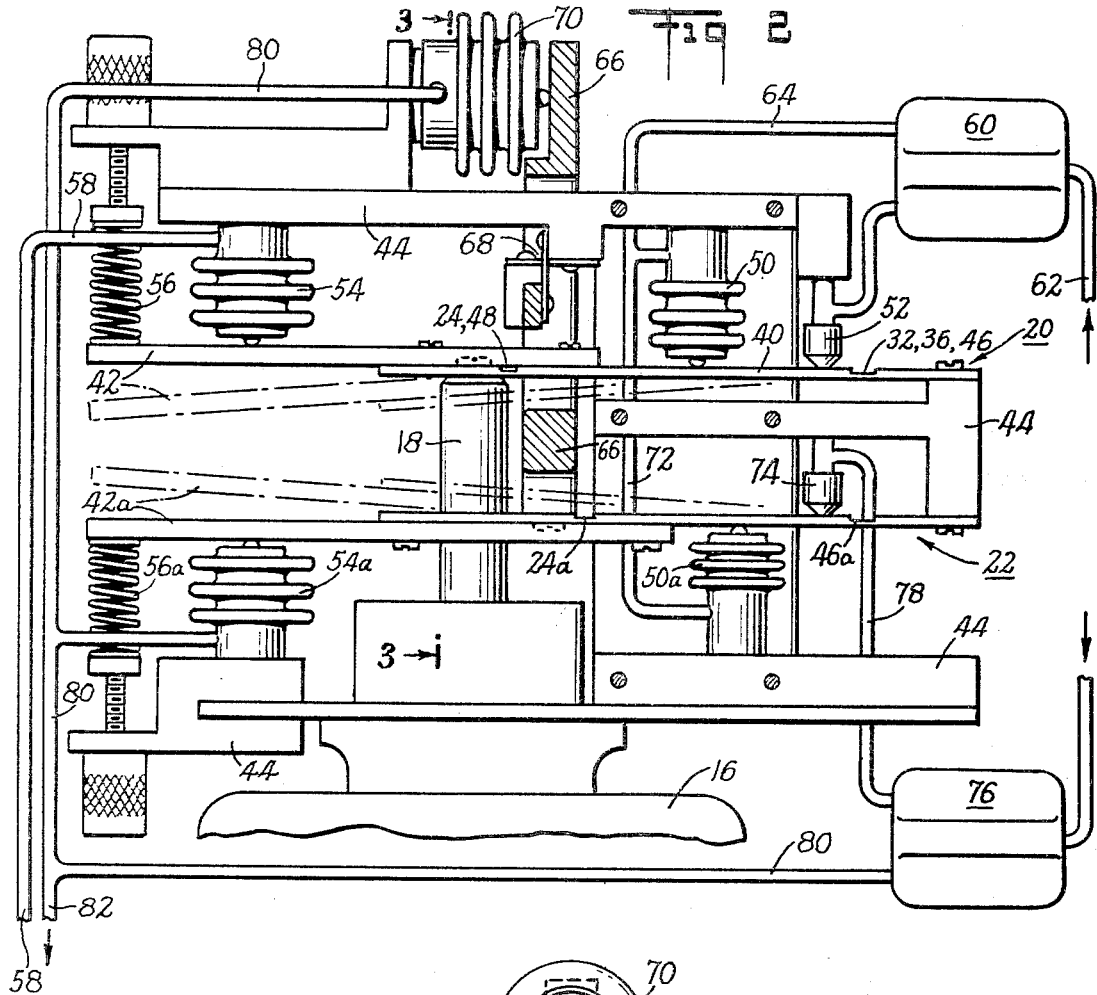
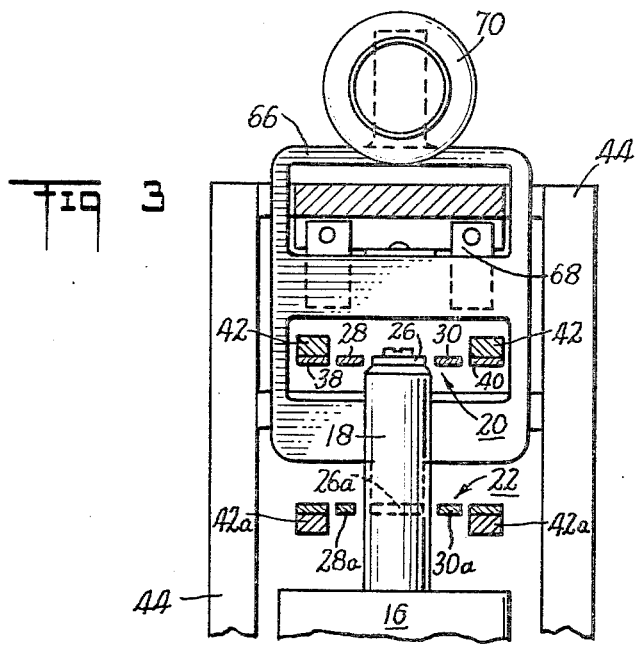

United States Patent Office 3,401,561
Patented Sept. 17, 1968

3,401,561
DIFFERENTIAL PRESSURE RESPONSIVE APPARATUS
Lyman Cook, Foxboro, Mass., assignor to The Foxboro Company, Foxboro, Mass., a corporation of Massachusetts
Filed Aug. 9, 1966, Ser. No. 571,335
9 Claims. (Cl. 73—205)

This invention relates to industrial process instruments. The primary purpose of the instrument herein disclosed is to measure and indicate the amount of gas passing through a conduit with which the instrument is connected, and complete understanding of the instrument requires consideration of certain points about gas itself.

Amounts of gas cannot be calculated in mere terms of volume, for gas is compressible—but amounts of gas for practical purposes can be calculated in terms of volume plus concentration, i.e. density. Thus concentration is a direct factor of the amount of gas flowing through a conduit, and knowledge of the rate of flow of gas having a known degree of concentration is, in effect, a measurement of the quantity of gas that passes a given point within a certain period of time.

Fluid flow is commonly measured deductively by inserting an orifice plate or the equivalent into the flow stream, sensing the pressure drop developed by the passage of the fluid through the orifice, and calculating the fluid flow rate from this differential pressure. But if it is desired to measure the total amount of fluid flowing in the stream, and the fluid is compressible such as a gaseous fluid, there can be variations in actual mass flow of the fluid not reflected by the differential pressure across the orifice. The differential pressure, therefore, if used as an indication of quantity of flow, must be correlated to the concentration of the gas.

Although it is difficult to determine concentration directly, in certain commercially important applications changes in concentration can be determined for practical purposes by sensing the corresponding changes in static pressure of the gas. Thus in the instrument disclosed herein, static pressure measurements are used together with differential pressure measurements to produce a signal representing actual gas flow.

One specific object of this invention is to provide improved apparatus for measuring the amount of flow per unit of time of a gaseous fluid through a pipe line.

Still another object is to provide apparatus capable of putting out a signal which is continuously corrected for changes in static pressure so as to provide at any instant an indication of the mass flow rate of a flowing gas.

Other objects, aspects and advantages of the invention will in part be pointed out in and in part apparent from the following description considered together with the accompanying drawings, in which is illustrated schematically an instrument according to the invention for measuring the mass flow rate of a gaseous fluid in a pipe line, and producing a signal indicating that rate at any instant.

FIGURE 2 is an elevation of the apparatus, partly in section with certain elements shown schematically; and FIGURE 3 is a vertical section of certain components of the apparatus.

Figure 1:
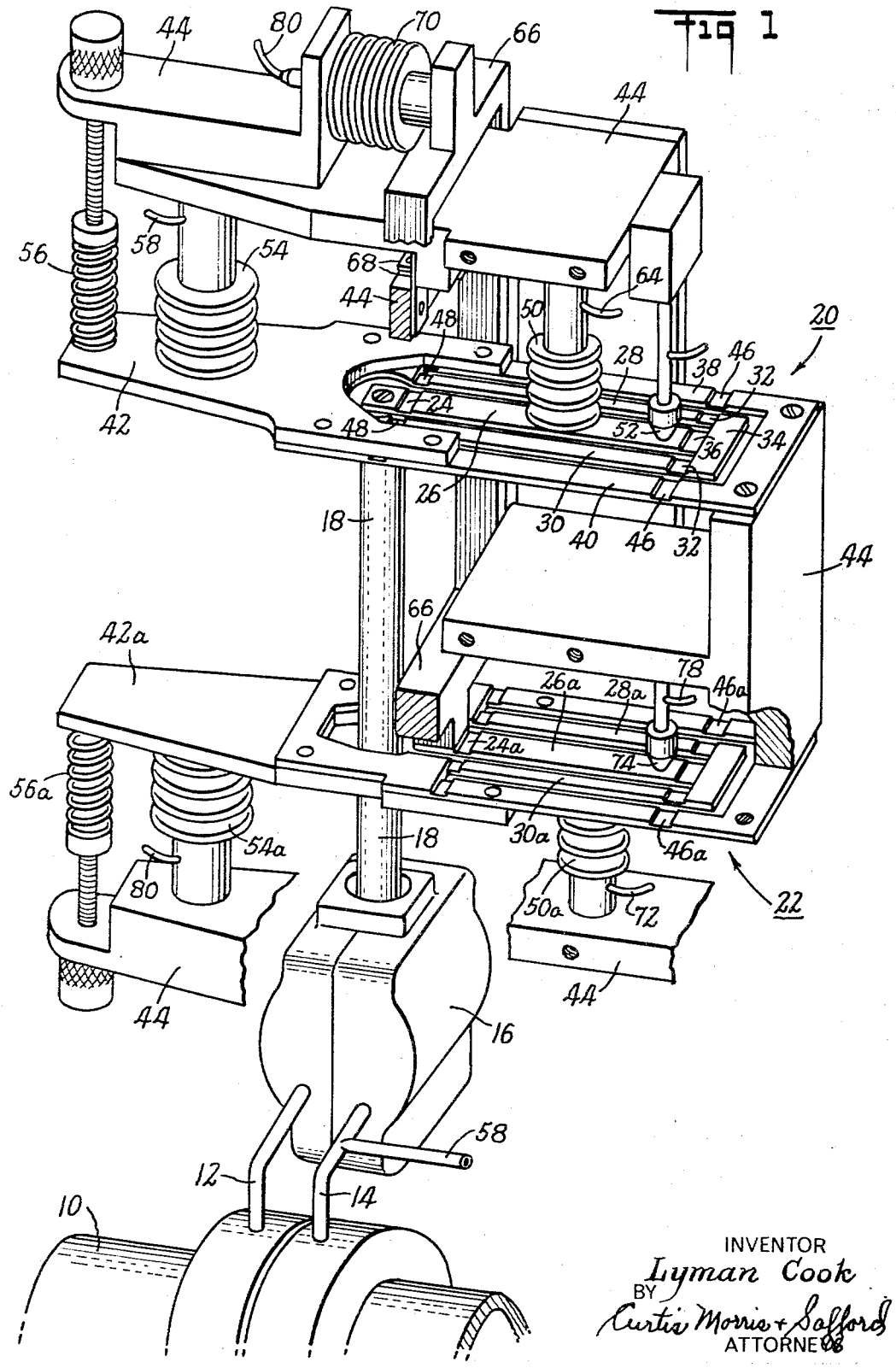
FIGURE 1 is a perspective view of the principal operating parts of an instrument in accordance with this invention.

Referring to FIGURE 1, there is shown in the lower left-hand corner a pipe 10 which may, for example, be part of a natural gas transmission line. This pipe is provided with a conventional orifice plate (not shown) to produce a differential pressure proportional to the fluid flow rate. The pressures upstream and downstream of this orifice plate are conducted by respective tubes 12 and 14 to a differential pressure cell 16 in which the differential pressure across the orifice produces a force against the lower end of a force bar 18 tending to tip the bar counterclockwise about a pressure sealing diaphragm (not shown) so that its upper end as shown in FIG. 1 tends to move toward the left. The details of construction of the differential pressure cell 16 and the sealing diaphragm can be found in various prior patents, such as U.S. Patents 2,770,258 and 2,806,480.

Bar 18 extends up into the measuring instrument which consists basically of two separate stages 20 and 22, mechanically quite similar. The upper end of bar 18 terminates at the upper stage 20 and is there connected by a pivot flexure 24 to a balanceable member 26 the forces on which are maintained in balance by feedback means to be described hereinbelow. Due to the action of cell 16, bar 18 applies to member 26 a longitudinal leftward pulling force proportional to the differential pressure across the orifice in pipe 10.

Balanceable member 26 is part of a mechanism composed of five parallel elements interconnected by flexures and comprising intermediate reaction arms 28 and 30 attached by flexures 32 to a head-piece 34, to which the member 26 also is connected by flexure 36. The two outer arms 38 and 40 of this mechanism are rigidly attached to a yoke-like member 42 and are pivotally mounted to the supporting frame 44 of the instrument by flexures 46 aligned with flexures 32 and 36. Yoke 42 is attached by flexures 48 to the intermediate reaction arms 28 and 30 so that the angular positioning of the yoke 42 about flexures 46 determines the angular positioning of the reaction arms about flexures 32.

The balanceable member 26 receives a rebalance force from a force-transmitting means comprising a pneumatic bellows 50 substantially at right angles to the longitudinal force applied through flexure 24 by bar 18. The magnitude of this bellows force is continually adjusted, under the control of a pneumatic detector nozzle 52 so as to maintain the forces on the balanceable member in balance. The magnitude of the required rebalance force depends on the angular positioning of the reaction arms 28 and 30, and this angle in turn is set by another force-transmitting means in the form of a pneumatic bellows 54 acting against the end of the yoke 42 in opposition to the force of an adjustable tension spring 56. Copending application Ser. No. 469,259 filed July 2, 1965, now U.S. Patent No. 3,325,098, describes the construction and operation of a similar force-balancing arrangement.

The angular positioning of yoke 42 is made proportional to the static pressure in pipeline 10 by connecting bellows 54 through a conduit 58 to one of the differential pressure lines 14. Thus bellows 54 tends to force the end of yoke 42 downwardly (as viewed in FIGURES 1 and 2) about the flexures 46 an amount proportional to the static pressure. The longitudinal tension force on balanceable member 26 due to the differential pressure will, with the yoke 42 tilted downwardly, tend to move the head-piece 34 upwardly. Such upward motion decreases the spacing between the balanceable member 26 and the detector nozzle 52, which is supplied with a gas under pressure, such as air, through the usual flow restrictor (not shown), and thus reduces the air flow so as to increase the nozzle back pressure. As is well known, the full range of back pressure variation of such "nozzle-flapper" sensing devices will be obtained with total movement of the flapper (e.g., the balanceable member 26) of less than 0.001 inch. Thus, slight variations in the positioning of the balanceable member 26 will be immediately sensed through the action of nozzle 52.

The back pressure of the nozzle 52 is coupled to the usual pneumatic relay 60 (FIGURE 2) having a supply pressure line 62, e.g., supplying air at 20 p.s.i.g., and whose output 64 is directed to bellows 50 wherein its acts to restore the balanceable member 26 to a balanced position. For example, if the arm is moved upwardly, as by an increase in the longitudinal force applied by bar 18, the decreased space between nozzle 52 and member 26 increases the back pressure to the relay, increasing its output to bellows 50 which tends to hold member 26 away from the nozzle at a force-balance position.

Application Ser. No. 469,259 discusses in detail the relationships between the forces in a balancing system of this nature. In brief, with suitable attention to the proportionality constants, the output signal represented by the pressure of relay 60 corresponds to the product of the signal represented by the longitudinal force (applied by bar 18) and the signal represented by the static pressure in bellows 54.

This output pressure thus corresponds not only to the rate of flow of the gas, but also its static pressure as well. In this output pressure, then, are the elements necessary to determine the quantity of gas flow in those circumstances where static pressure is indicative of concentration. However, this output pressure varies with flow rate in accordance with a non-linear (square-law) function; that is, the incremental change in output pressure for a given incremental change in flow-rate is not uniform throughout the operating range of the instrument. Since it is preferable to provide a linear output signal, the square-law relationship inherent in a differential pressure flow measurement is compensated for by the second stage 22 arranged to produce a final output signal proportional to the square-root of the first, or intermediate, output signal.

The second stage 22 comprises a force-balance arrangement similar to that in the first stage 20, and previously described, having a balanceable member 26a, intermediate reaction arms 28a, 30a and a yoke-like member 42a connected by appropriate flexures. Pneumatic bellows 50a transmits force against balanceable member 26a perpendicular to its longitudinal axis. A longitudinal force is applied to this member by a lever 66 pivoted on crossflexures 68 about frame 44 and connected to member 26a by a flexure 24a. Pneumatic bellows 70 tips lever 66 clockwise, as viewed in FIGURES 1 and 2, about cross-flexures 68 and thus applies a longitudinal leftward pulling force on the member 26a. A bellows 54a controls the angular positioning of yoke 42a by pivoting it upwards about flexures 46a and against the restraint of spring 56a.

The intermediate output pressure from first stage 20 is transmitted through a line 72 (FIGURE 2) to bellows 50a wherein it tends to force balanceable member 26a upwardly. Variations in this pressure are sensed by a nozzle 74 associated with member 26a, and changes in the back pressure of this nozzle are fed, through another relay 76, to both bellows 54a and 70, so as to effect a rebalance of the forces on member 26a. For example, if the intermediate output pressure increases, that would tend to decrease the spacing between mmber 26a and the nozzle 74, increasing its back pressure. Line 78 transmits that back pressure to relay 76 whose output is thereby correspondingly increased. That increase in relay output, passing through line 80 to bellows 54a, causes the end of yoke 42a to be moved upwardly to a new position having a larger angle of tilt. The correspondingly increased pressure transmitted through line 80 to bellows 70 simultaneously increases the longitudinal leftward pulling force applied by lever 66 to member 26a. Both of those actions tend to increase the downward component of force produced on member 26a by the leftward pull of lever 66, and therefore these actions serve to rebalance the increased upward force of the intermediate output pressure from the first stage 20.

The relationship between the various forces is such that the signal represented by the output pressure of relay 76 is proportional to the square-root of the corresponding signal represented by the intermediate output pressure of the first stage. Thus the final output is proportional to the square-root of the product of the differential pressure across the orifice in pipeline 10, and the static pressure in that line.

Accordingly, the output pressure in line 82 of this device is linearly proportional to the mass flow rate of a gaseous fluid flowing in the pipeline 10 under the assumed conditions where concentration corresponds to static pressure. Such an output signal can be used, for example, as part of process control instrumentation to measure and record, and, if desired, to control, the mass flow rate of a gas.

The instrument described herein has a number of advantageous features. It is capable of relatively high accuracy because all of the operating elements are arranged in force-balance ssytems. Lost motion and hysteresis effects are minimized by the compact configuration and by the short linkage connections made possible by mounting all of the necessary components directly at the pipeline. Construction costs are reduced by utlizing the same component designs for different functions in the instrument. The overall design provides a high degree of ruggedness which assures good realiability for extended periods.

It should be apparent that this invention is not limited to the specific arrangement disclosed, and numerous equivalent arrangements will be apparent to those skilled in the art. Accordingly, this disclosure should not be construed to restrict the scope of the present invention but to illustrate the invention so that those skilled in the art may apply it in various ways to suit different requirements and conditions.

I claim:

1. Apparatus for measuring the flow of a gas and for producing a signal corresponding to the measured flow, comprising, in combination:

means in the flowing gas stream to create a pressure drop and to develop a differential pressure signal corresponding thereto, first sensing means comprising a pressure cell responsive to said differential pressure to produce a first input force-signal corresponding to said differential pressure signal, a force bar coupled at one end thereof to said pressure cell to be acted on by said first input force-signal, second sensing means responsive to a characteristic of said gas for producing a second force-signal proportional to the value of said characteristic;

a first stage mechanism for producing an intermediate signal representing the product of said first and second force-signals, said mechanism comprising a first balanceable member, means connecting the other end of said force bar to said balanceable member to transmit thereto a force corresponding to said first force-signal; a first reaction element, a connecting flexure directly securing said reaction element to said balanceable member so that said reaction element serves to control the extent of movement of said balanceable member in response to changes in force applied thereto, first force-transmitting means for applying a force to said balanceable member, second force-transmitting means for adjusting the angular position of said reaction element with respect to said balanceable member so as to adjust the extent of movement of said balanceable member in response to changes in force thereon, first feedback means responsive to movement of said balanceable member for producing a rebalance signal corresponding to any unbalance of forces on said member, means for directing said second force-signal to one of said force-transmitting means, means for directing said rebalance signal to the other of said force-transmitting means to maintain the forces on said member in balance, said rebalance signal thereby serving as said intermediate signal and representing by its magnitude the product of said first and second force-signals;

and a second stage mechanism physically mounted together with said first stage mechanism and structurally similar thereto, said second stage mechanism serving to produce a final output signal corresponding to a square-root function of the quantity represented by said intermediate signal, so that the final output signal is linearly related to the gas flow rate, said second stage mechanism comprising a second balanceable member, a second reaction element secured to said second balanceable member by a second connecting flexure, a set of three force-transmitting means consisting of third and fourth force-transmitting means for applying transversely-directed forces to said balanceable member and a fifth force-transmitting means for adjusting the angular position of said second reaction element with respect to said second balanceable member, second feedback means responsive to movement of said second balanceable member for producing a rebalance signal corresponding to any unbalance of forces on said second balanceable member, means for directing said intermediate signal to one of said set of three force-transmitting means, and means for directing said rebalance signal to the remaining two force-transmitting means of said set, so that said second rebalance signal serves as a final output signal corresponding to the square-root of the product of the signals representing said gas flow rate and said characteristic respectively.

2. Apparatus as claimed in claim 1, wherein said second sensing means comprises means responsive to the static pressure of the flowing gas.

3. Apparatus as claimed in claim 1, wherein the balanceable members are elongate in form and are parallel to one another, said force bar extending in a direction perpendicular to the longitudinal dimension of said balanceable members.

4. Apparatus as claimed in claim 3, wherein said second stage mechanism is located between said pressure cell and said first stage mechanism.

5. Apparatus as claimed in claim 1, including a frame adapted to be mounted adjacent the flowing stream of gas, first and second support flexures mounting one end of said reaction elements to said frame respectively, said connecting flexures securing the other ends of the reaction elements to the corresponding balanceable member.

6. Apparatus as claimed in claim 1, wherein said force-transmitting means comprises pneumatic devices for developing forces corresponding to respective pneumatic signals.

7. Apparatus as claimed in claim 6, wherein said feedback means includes pneumatic nozzle means positioned adjacent the balanceable member so that the nozzle back pressure varies with changes in position of the balanceable member.

8. Apparatus as claimed in claim 7, wherein the intermediate output signal of said first stage mechanism is a pneumatic signal, said third force-transmitting means comprises a bellows arranged to apply to said second balanceable member a force corresponding to said intermediate output signal.

9. Apparatus as claimed in claim 1, wherein said balanceable members are elongate, said force bar being coupled to one end of said first balanceable member to apply a longitudinal force thereto, means to apply said second force-signal to said second force-transmitting means to control the angular position of said first reaction element with respect to said balanceable member; said first feedback means being arranged to apply to said first balanceable member a transverse force of a magnitude to maintain the forces thereon in balance, said third force-transmitting means being arranged to apply to said second balanceable member a transverse force corresponding to the intermediate output signal, the rebalance signal of said second feedback means being directed to said fourth and fifth force-transmitting means.

References Cited
UNITED STATES PATENTS

| | | | |
|---|---|---|---|
| 2,451,425 | 10/1948 | Allwein | 73—205 X |
| 2,736,199 | 2/1956 | Ibbott | 73—205 |
| 2,770,968 | 11/1956 | Grey | 73—205 |

RICHARD C. QUEISSER, *Primary Examiner.*

EDWARD D. GILHOOLY, *Assistant Examiner.*